March 17, 1942.   H. M. PFLAGER   2,276,336
RAILWAY TRUCK STRUCTURE
Filed June 20, 1940   2 Sheets-Sheet 2

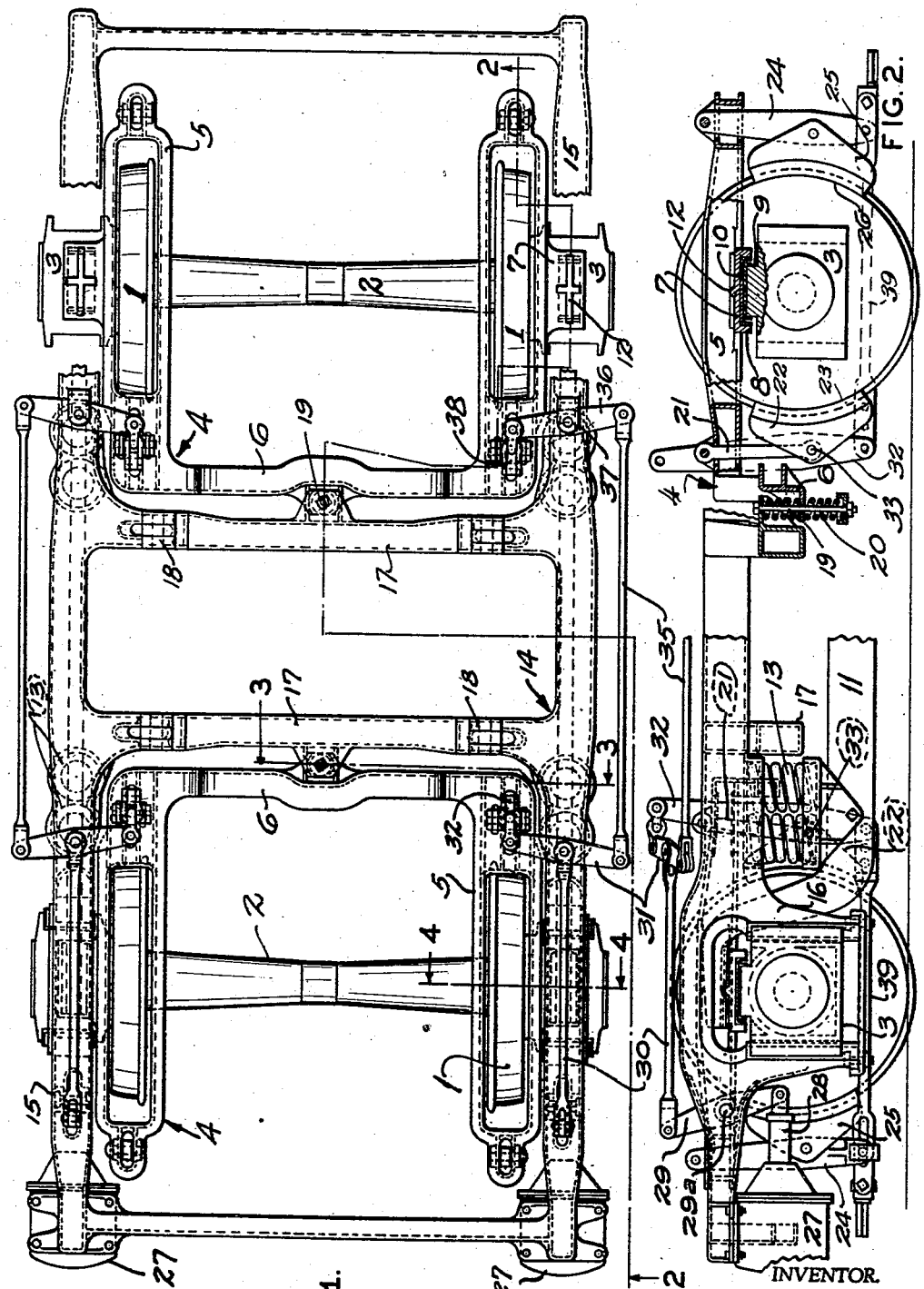
March 17, 1942.  H. M. PFLAGER  2,276,336
RAILWAY TRUCK STRUCTURE
Filed June 20, 1940  2 Sheets-Sheet 1
INVENTOR.
HARRY M. PFLAGER
BY Rodney Bedell
ATTORNEY.

INVENTOR.
HARRY M. PFLAGER
BY
Rodney Bedell
ATTORNEY.

Patented Mar. 17, 1942

2,276,336

UNITED STATES PATENT OFFICE 2,276,336

RAILWAY TRUCK STRUCTURE

Harry M. Pflager, St. Louis, Mo., assignor to General Steel Castings Corporation, Granite City, Ill., a corporation of Delaware Application June 20, 1940, Serial No. 341,409

12 Claims. (Cl. 188—56)

The invention relates to railway rolling stock, and more particularly to the mounting of the brake gear on vehicle trucks.

In the ordinary railway truck construction, the truck brake levers, the brake hangers, and the brake beams, including the brake heads and shoes, carried by the hangers, are supported directly by the main truck frame and all of the braking forces and reactions are carried directly to the truck frame when the brakes are applied. Since the truck frame is spring supported upon the wheeled axles, the action of the springs varies the relation between the wheels and the brake heads and shoes and, further, the application of the brakes tends to affect the free operation of the springs. As the result of this usual construction, brake application disturbances such as chattering, sudden brake hanger pulling forces, and other vibrations and shocks are transferred directly to the truck frame and thence to the vehicle body. The main object of the present invention is to segregate these forces from such transmission to the truck frame and vehicle body and to maintain desired alignment and other relative positions of the brake gear and the wheels.

These and other detail objects as will be apparent from the following description are attained by the structure illustrated in the accompanying drawings, in which—

Figure 1 is a top view of a four-wheeled equalized truck with a portion of the truck frame broken away to more clearly illustrate the present invention.

Figure 2 is a side elevation and longitudinal section of the truck taken approximately on the line 2—2 of Figure 1.

Figure 3:
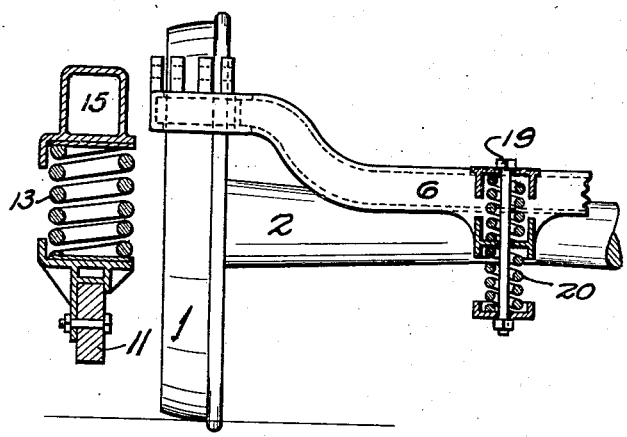
Figures 3 and 4 are detail vertical transverse sections taken on the corresponding section lines of Figure 1.
Figure 4:
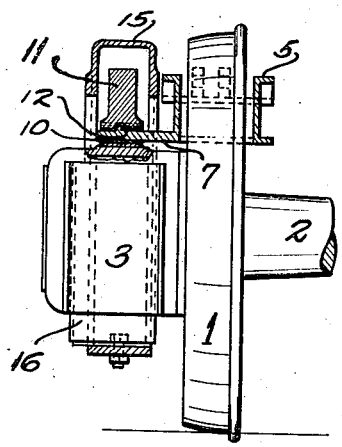

The truck illustrated in Figures 1–4 includes wheels 1, axles 2 with their ends mounting journal boxes 3 as in ordinary construction. Supported on each pair of journal boxes 3 is a brake gear carrying frame 4 preferably of U-shape with spaced arms 5 overlying the axle and with a cross piece 6 connecting the ends of arms 5 nearer the middle of the truck. Each arm 5 straddles the adjacent wheel and includes a bracket or shelf 7 resting upon the adjacent journal box. Each shelf 7 is flanged downwardly at its ends 8 to oppose upstanding shoulders 9 on the journal box to prevent shifting of the box and frame longitudinally of the truck and, preferably, renewable wear plates 10 are interposed between the boxes and frame 4.

Drop equalizers 11 extend between journal boxes at the same side of the truck with their ends resting upon brackets 7, there being upstanding ridges 12 on brackets 7 fitting in corresponding grooves in the equalizer to hold the same against shifting. Truck springs 13 are carried by equalizers 11 and a truck frame 14 is supported on springs 13 in the usual manner. Frame 14 includes wheel pieces 15 extending over the journal boxes and having pedestals 16 slidably receiving the journal boxes. The frame also includes transverse transoms 17 extending between the wheel pieces and providing bearings 18 for well known swing hanger links (not shown) by which the truck bolster (not shown) is suspended from the truck frame to provide lateral motion support for the vehicle body.

Each brake gear frame 4 has a third point support at 19 on the adjacent transom 17 and, preferably, this support is of a yielding nature as provided, for example, by springs 20. Brake hangers 21 are pivotally suspended from the inner ends of arms 5 and mount individual brake heads 22 and shoes 23. Combination hangers and dead levers 24 are suspended from the outer ends of arms 5 and mount corresponding brake heads 25 and shoes 26. A brake operating cylinder 27 is mounted on each side of truck frame 14 and operates the brake heads and shoes at that side of the truck. Its piston rod 28 is connected to a lever 29 fulcrumed at 29a on the truck frame and actuating a pull rod 30 connected to an equalizing lever 31 having one end attached to a live lever 32 which passes downwardly through a slot in frame 4 in alignment, longitudinally of the truck, with the adjacent wheel, and lever 32 is pinned at 33 to the corresponding brake head 22. The other end of lever 31 is connected by a pull rod 35 to one end of a corresponding lever 36 pivoted on a truck frame bracket 37 with its opposite end connected to a brake lever 38 corresponding to lever 32. The lower ends of levers 32 and 38 are connected to dead levers 24 by bottom rods 39.

The above described construction provides for the attainment of the objects set forth in the introductory portion of the specification. The shocks incident to the application of the brakes are transmitted directly to arms 5 on the brake gear carrying frames, which arms are primarily supported directly upon the journal boxes, and while the third points of support indicated at 19 stabilize the gear frames and resist tilting of the same about the axles, the leverage afforded by the spacing of points 19 from the axles and the yielding support afforded by springs 20 tend to reduce the transmission of the braking forces and reactions to the frame so that they will not be objectionable.

Figure 6:
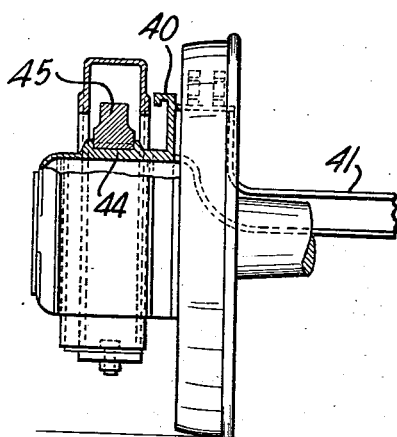
Figure 6 is a detail vertical transverse section taken on the line 6—6 of Figure 5 and showing the structure assembled with a wheel and axle.
Figure 5:
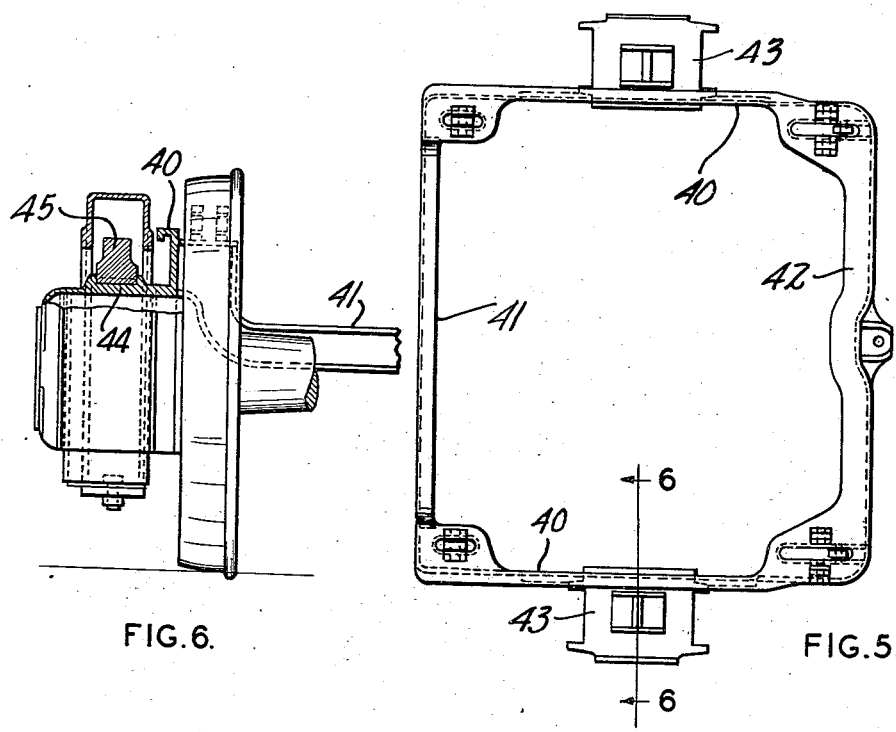
Figure 5 is a top view of a brake carrying frame structure embodying another form of the invention.

Figures 5 and 6 illustrate another form of the gear carrying frame structure in which the sides of the brake gear carrying frame are connected at their outer ends by a cross piece 41 as well as being connected at their inner ends by a cross piece 42 corresponding to cross piece 6 in the form previously described. With this rectangular frame construction the sides may be made lighter and accordingly a single arm 40 is used instead of a double arm as previously described.

Journal boxes 43 are shown as being formed integrally with arms 40, the outwardly extending bracket 44 on each arm forming the top wall of the journal box and being arranged to support an equalizer 45 as are the brackets 7 in the structure previously described. This arrangement provides a more rigid construction, but each form of the invention has advantageous features distinct from the other and one or the other form may be preferred in a given installation.

It will be understood that frames 4, as shown in Figure 1, may include a cross piece corresponding to that shown at 41 in Figure 5, but without the integral journal boxes, and that frames 4 may each include integral journal boxes as indicated in Figure 5, with or without the cross piece 41.

These and other variations and details may be made without departing from the spirit of the invention, and the exclusive use of all forms of the invention coming within the scope of the appended claims is contemplated.

What is claimed is:

1. In a railway truck, spaced wheeled axles, journal boxes on said axles, brake gear carrying structure mounted on each of said journal boxes, equalizers extending between said axles and resting on said structure, and a truck frame supported on said equalizers.

2. In a railway truck, spaced wheeled axles, journal boxes on said axles, a frame for carrying the brakes for the wheels of each axle, each of said frames being supported in part on the journal boxes on the corresponding axle, equalizers extending between said axles and resting on said frames, a truck load-carrying frame spring supported on said equalizers, and resilient means supporting in part each of said brake gear carrying frames from said truck load-carrying frame.

3. A railway truck as described in claim 1 which also includes interengaging elements on the journal boxes and brake gear carrying structure for preventing shifting of the same relative to each other.

4. In a railway truck, wheeled axles, a brake gear carrying frame including portions supported on one of said axles, a truck frame resiliently supported from said portions, a brake cylinder mounted on said truck frame, a brake lever pivoted on said gear carrying frame and operatively connected to said cylinder, and wheel-engaging brake shoes suspended from said gear carrying frame and operatively connected to said lever, said truck frame providing a support for said gear-carrying frame at a point spaced from said axle.

5. In a railway truck, an axle, wheels and journal boxes thereon, a brake gear carrying frame supported in part on said journal boxes, a truck frame supported from said brake gear carrying frame over said boxes and providing a support for said brake gear carrying frame at a point spaced longitudinally of the truck from said axle, said gear carrying frame including portions aligned with said wheels longitudinally of the truck, wheel-engaging shoes suspended from said portions, and means for applying said shoes to the wheels, said means being supported on said truck frame and said gear carrying frame.

6. A brake gear carrying frame for a railway truck comprising a U-shaped member with arms arranged to be supported upon journal boxes at opposite ends of a truck axle and with a cross piece connecting said arms and arranged to be supported on a truck frame at a point spaced from the axle, said arms having elements for mounting wheel-engaging shoes and shoe actuating levers.

7. A structure as described in claim 6 in which the arms have apertures to straddle a wheel and form brake shoe supporting bearings in longitudinal alignment with said apertures.

8. A brake gear carrying frame for a railway truck comprising a rectangular structure with opposite sides provided between their ends with integral journal boxes for mounting upon the end portions of an axle, there being cross pieces connecting the ends of said sides and one of said cross pieces being arranged to be supported on a truck frame at a point spaced from the axles, and said sides being arranged to mount brake shoes applicable to wheels on the frame supporting axle.

9. In a railway truck, a wheeled axle, a brake gear carrying structure having a portion supported by said axle, and a load-carrying frame resiliently supported on said portion, said structure also being supported from a part of said load-carrying frame spaced from said axle.

10. In a truck frame, a wheeled axle, a truck frame supported therefrom, a brake gear carrying frame comprising spaced arms supported from opposite ends of said axle, a cross piece connecting said arms and supported on said truck frame at a point spaced from said axle, and wheel engaging brake elements carried by said brake gear carrying frame.

11. In a railway truck, a wheeled axle, a truck frame supported therefrom, a brake gear carrying frame comprising a rectangular structure with opposite sides supported between their ends upon the end portions of said axle, there being cross pieces connecting the ends of said sides and one of said cross pieces being supported on said truck frame at a point spaced from the axle, and friction brake members carried by said sides and arranged for application to the wheels on said axle.

12. In a railway truck, a wheeled axle, journal boxes mounted on the end portions of said axle, a brake gear supporting frame mounted on said journal boxes and having brake gear supporting portions spaced inwardly from said boxes, a truck frame supported by said journal boxes and including a transverse member spaced from said axle, said brake gear carrying frame having a third point of support on said transverse member in a line extending longitudinally of the truck intermediate said boxes.

H. M. PFLAGER.